(12) United States Patent
Dallas

(10) Patent No.: US 7,909,478 B2
(45) Date of Patent: Mar. 22, 2011

(54) MULTI BATTERY TYPE FLASHLIGHT

(75) Inventor: Edgar A. Dallas, Beaverton, OR (US)

(73) Assignee: Fiskars Brands, Inc., Madison, WI (US)

( * ) Notice: Subject to any disclaimer, the term of this patent is extended or adjusted under 35 U.S.C. 154(b) by 435 days.

(21) Appl. No.: 11/834,523

(22) Filed: Aug. 6, 2007

(65) Prior Publication Data

US 2009/0040752 A1    Feb. 12, 2009

(51) Int. Cl.
*F21L 4/04*    (2006.01)

(52) U.S. Cl. ........ 362/202; 362/208; 320/106; 320/110; 429/99; 439/500

(58) Field of Classification Search .................. 362/202, 362/208; 320/106, 110; 429/99; 439/500
See application file for complete search history.

(56) References Cited

U.S. PATENT DOCUMENTS

| | | | | |
|---|---|---|---|---|
| 3,510,644 A | * | 5/1970 | Braese | 362/202 |
| 3,809,882 A | * | 5/1974 | Wetmore | 362/186 |
| 4,005,353 A | | 1/1977 | Yokoyama | |
| 5,872,831 A | * | 2/1999 | Zoiss et al. | 379/21 |
| 6,851,828 B1 | * | 2/2005 | Hansen | 362/203 |
| 7,126,595 B2 | * | 10/2006 | Yanagi et al. | 345/211 |
| 2005/0122715 A1 | | 6/2005 | Furth et al. | |
| 2007/0103114 A1 | * | 5/2007 | Hoffman | 320/114 |
| 2007/0171084 A1 | * | 7/2007 | Potter | 340/628 |
| 2008/0068832 A1 | * | 3/2008 | Spartano et al. | 362/157 |

OTHER PUBLICATIONS

International Search Report and Written Opinion for International Application No. PCT/US2008/067377, mailing date Dec. 12, 2008, 14 pages.
Energizers® Quick Switch Flashlight available at http://www.energizer.com/products/flashlights/flashlight.asp?cat=1&id=1, © 2006 Energizer (2 pgs.).
Partial International Search for Application No. PCT/US2008/067377, mailed Sep. 23, 2008; 4 pages.

* cited by examiner

*Primary Examiner* — Sandra L O Shea
*Assistant Examiner* — Mary Zettl
(74) *Attorney, Agent, or Firm* — Foley & Lardner LLP

(57) ABSTRACT

The invention relates to a portable lighting device including a body having a battery compartment, a head coupled to the body, a light source coupled to the head, the light source requiring a first voltage, and a circuit coupled to the light source. The battery compartment is configured to selectively receive batteries of different sizes. The circuit converts voltages of different magnitudes to the first voltage.

20 Claims, 3 Drawing Sheets

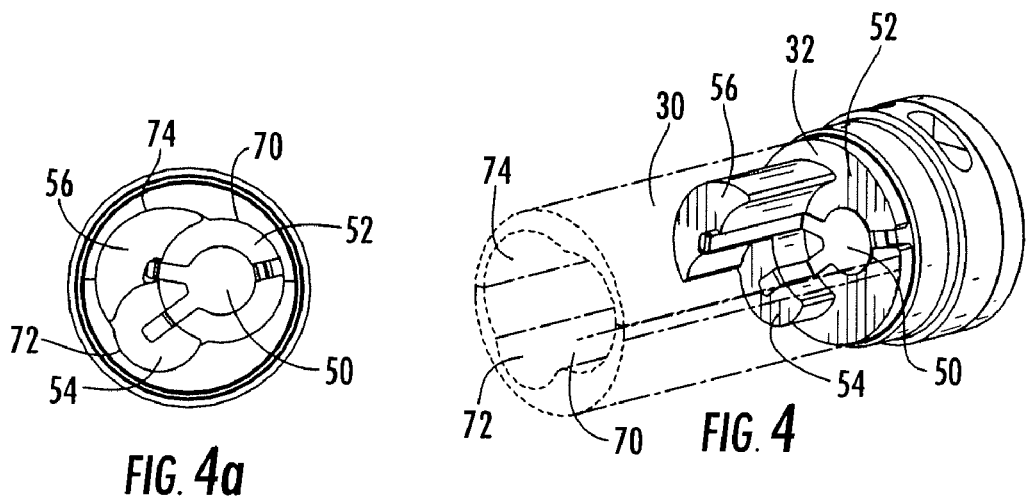
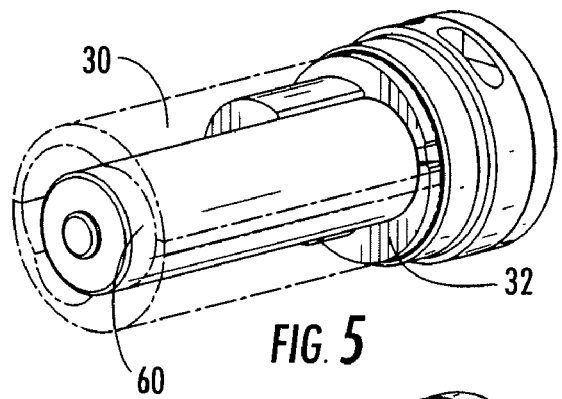
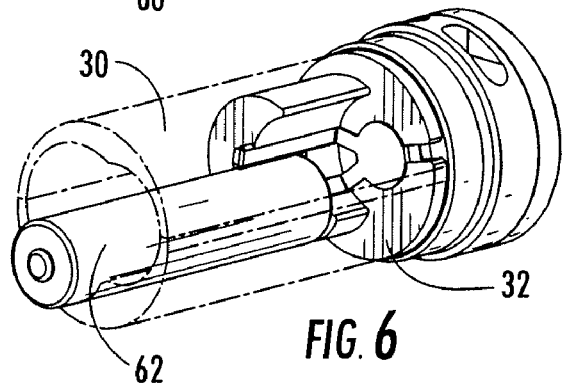
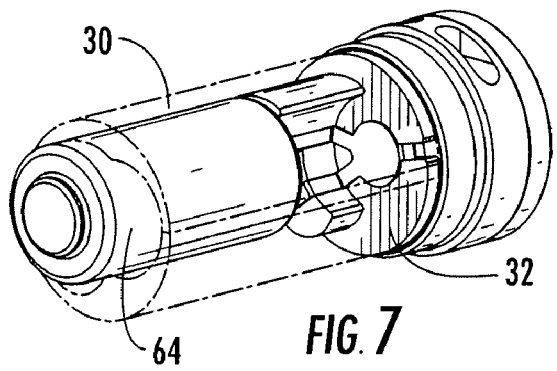

MULTI BATTERY TYPE FLASHLIGHT

BACKGROUND

The present invention relates to a portable lighting device. More particularly, the present invention relates to a portable lighting device that is capable of functioning on batteries of multiple types and/or sizes.

Portable lighting devices, such as flashlights, are common. A typical flashlight includes a cylindrical battery compartment that forms the handle of the flashlight. The battery compartment typically houses one or more batteries of the same kind. A front end, or head, typically houses a bulb or lamp. A switch mechanism controls the flow of electricity between the batteries and the lamp. Portable lighting devices are offered in a multitude of shapes and sizes and provide many options for a variety of disciplines including but not limited to: military; fire fighting; police; industry; camping; boating; outdoor sports; scuba; hunting; and general household use.

The need for a flashlight to be able to operate on more than just one size of battery is common among the above disciplines. It would be desirable for a user to be able to utilize whatever battery size is available, rather than searching, sometimes vainly, for the correct battery size. It would also be desirable for a flashlight to be able to automatically adapt to whichever battery is chosen.

Therefore, there is a need for a portable lighting device to be able to operate on batteries of multiple sizes. There is also a need for a portable lighting device to be able to automatically adjust to the size and type of battery chosen.

It would be desirable to provide a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment of the invention relates to a portable lighting device including a body having a battery compartment, a light source coupled to the body, and a circuit coupled to the light source. The battery compartment has a first sub-compartment sized to receive a first battery of a first size and a second sub-compartment sized to receive a second battery of a second size, wherein the second size is different than the first size. The circuit is adapted to provide a current from either the first battery or the second battery to the light source.

Another embodiment of the invention relates to a portable lighting device including a body, a head coupled to the body, a circuit board coupled to the head, and a light source coupled to the circuit board. The light source requires a first voltage. The circuit board converts voltages of different magnitudes to the first voltage.

A further embodiment of the invention relates to a portable lighting device including a body having a battery compartment, a head coupled to the body, a light source coupled to the head, the light source requiring a first voltage, and a circuit coupled to the light source. The battery compartment is configured to selectively receive batteries of different sizes. The circuit converts voltages of different magnitudes to the first voltage.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 4 is a perspective view of an internal battery compartment, according to an exemplary embodiment.

FIG. 4a is an end view of a battery compartment according to an exemplary embodiment.

FIG. 5 is a perspective view of an internal battery compartment containing a battery of a first size, according to an exemplary embodiment.

FIG. 6 is a perspective view of an internal battery compartment containing a battery of a second size, according to an exemplary embodiment.

FIG. 7 is a perspective view of an internal battery compartment containing a battery of a third size, according to an exemplary embodiment.

DESCRIPTION

Figure 1:
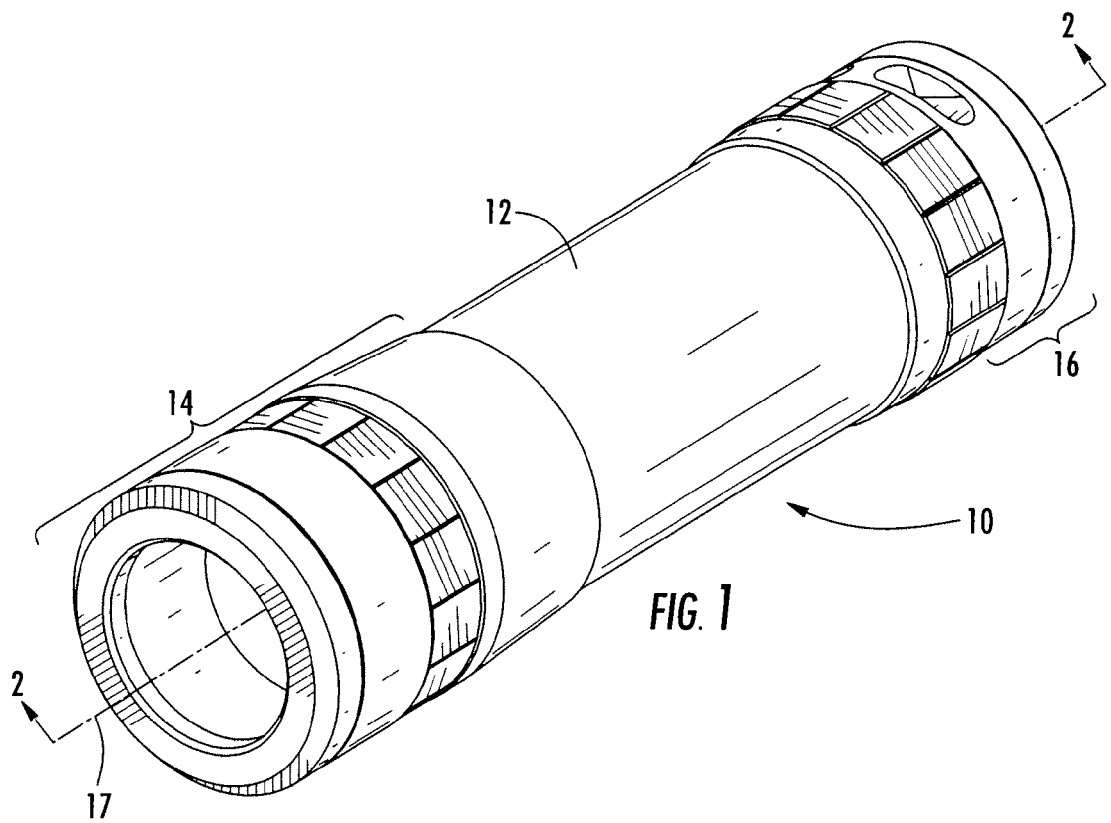
FIG. 1 is a front perspective view of a portable lighting device according to an exemplary embodiment.
Figure 2:
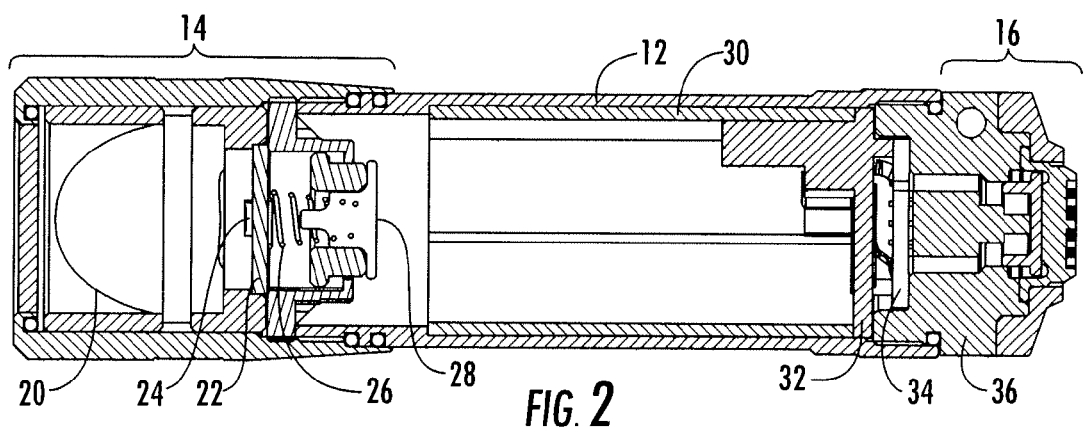
FIG. 2 is a sectional view taken generally along line 2-2 of FIG. 1.

Referring to FIGS. 1 and 2, a portable lighting device, shown as a flashlight 10, is illustrated in accordance with an exemplary embodiment. Flashlight 10 includes a body 12, a head assembly 14, and a tail assembly 16. Flashlight 10 is centered on a central axis, shown as longitudinal axis 17.

Body 12 is shown as having a cylindrical shape but may have other shapes as is known in the art. Body 12 may be made of metal, plastic, or other materials. Body 12 may contain a battery or another power source as well as internal wiring and/or a switch, which may be embodied in a variety of types and configurations as is generally known in the art.

Head assembly 14 may be provided with a threaded connection to rotationally couple head assembly 14 to body 12. In alternative embodiments, body 12 and head assembly 14 may be a single integral piece, secured with adhesive, snapped into position, or otherwise fastened. Head assembly 14 may be made of metal, plastic, or other materials, and centered on longitudinal axis 17.

Tail assembly 16 may be provided with a threaded connection to rotationally couple tail assembly 16 to body 12. In alternative embodiments, body 12 and tail assembly 16 may be a single integral piece, secured with adhesive, snapped into position, or otherwise fastened. Tail assembly 16 may be made of metal, plastic, or other materials, and centered on longitudinal axis 17.

Figure 3:
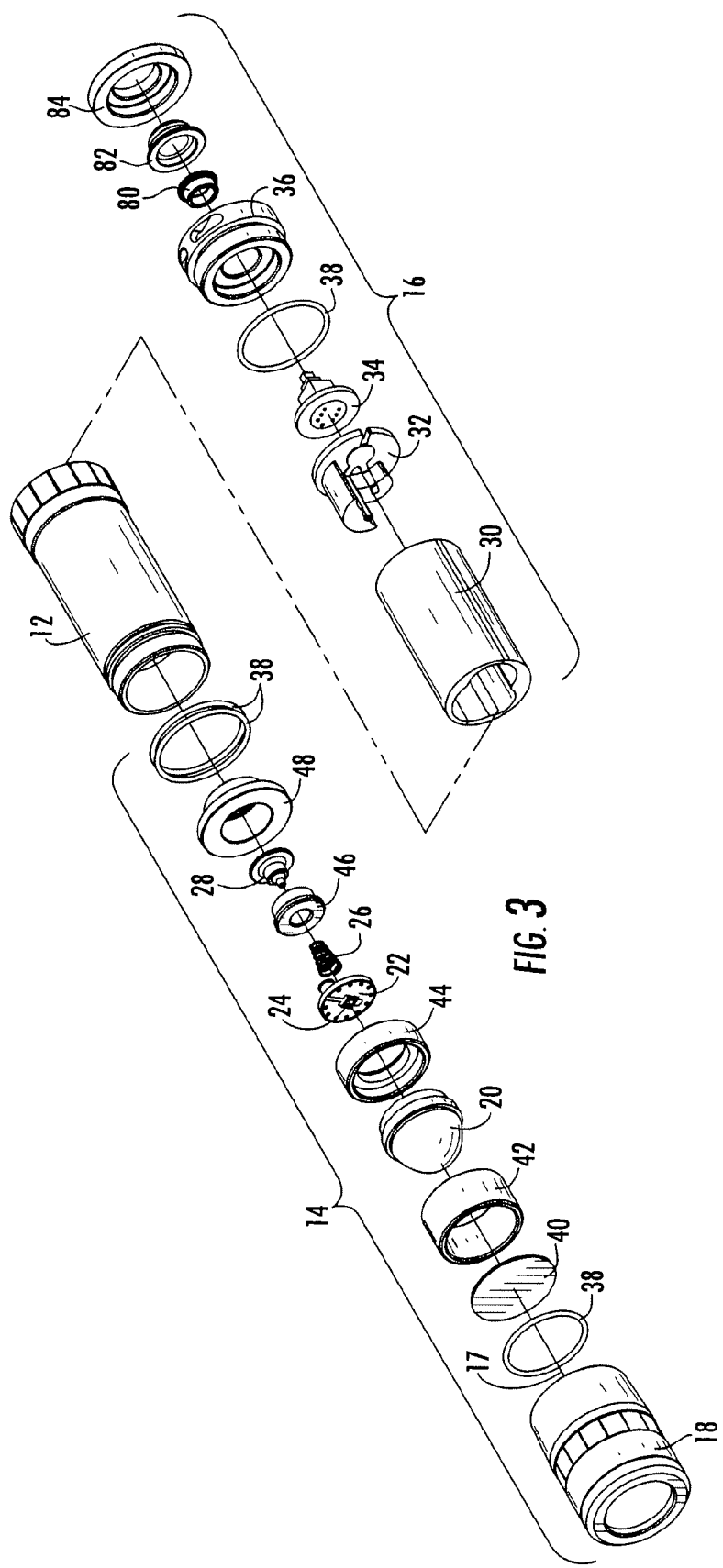
FIG. 3 is an exploded perspective view of a portable lighting device according to an exemplary embodiment.

In the embodiment shown in FIG. 3, head assembly 14 includes a head 18, a focusing device 20, a circuit board 22, a light source 24, a spring 26, and a front contact 28. Head assembly 14 also includes o-rings 38, a lens 40, and collars 42, 44, 46, and 48.

Referring to FIG. 3, focusing device 20 is coupled to head 18. Focusing device 20 may be any type of refractive lens or reflective mirror. In the exemplary embodiment shown in FIG. 3, focusing device 20 is a ball optical lens. In an alternative embodiment, the focusing device may be a parabolic reflector. Focusing device 20 may be made of glass, polycarbonate, or other materials.

Still referring to FIG. 3, circuit board 22 is coupled to head 18. In an alternative embodiment, the circuit board may be coupled to the body 12. Light source 24 is coupled to circuit board 22. In an alternative embodiment, the light source may be coupled to the body 12. In an exemplary embodiment, light source 24 is a high powered light emitting diode (LED). In alternative embodiments, the light source may be a conventional bulb, such as an incandescent, halogen, or krypton bulb, or any other source of light. If other bulb types are used, the light source may be connected to a light mount (not shown) by a threaded connection, a bayonet connection, or other connection types as are known to the art. The light mount may further contain mounting posts, electronic controls, battery terminals, switches, or any method of support or control required by an alternate light source.

In the exemplary embodiment shown in FIG. 3, front contact 28 is coupled to the rear of circuit board 22 via spring 26. In various embodiments, the front contact may be coupled to the body 12. The spring 26 is coupled to the circuit board 22. In various embodiments, the spring may also be coupled to the body 12 or free standing and held in place by surrounding components. In the exemplary embodiment shown in FIG. 3, spring 26 exerts a biasing force on front contact 28, keeping front contact 28 in contact with the terminal or contact surface of a battery as shown in FIGS. 5-7. Front contact 28 has a circular or disc shape and is configured to make contact with the positive terminals of batteries of multiple sizes or types. In alternative embodiments, the front contact may be other shapes or sizes. Front contact 28 and spring 26 may be made of metal or other suitable materials known in the art.

Referring to FIGS. 3-7, tail assembly 16 includes a battery compartment 30, a rear contact assembly 32, a switch 34, and a tail 36. Tail assembly 16 also includes an o-ring 38, a cover 80, and collars 82 and 84. Battery compartment 30 includes a first sub-compartment 70, a second sub-compartment 72, and a third sub-compartment 74. In various embodiments, the battery compartment may be within the body 12, or may be integral with the body 12. In the embodiment shown in FIGS. 3-7, battery compartment 30 is centered on longitudinal axis 17. Battery compartment 30 is shaped and sized to locate a chosen battery (or batteries of the same size and type if in a series or parallel configuration) as close as possible to longitudinal axis 17, minimizing the overall size of flashlight 10. In various embodiments, the battery compartment may not be centered on longitudinal axis 17. In the exemplary embodiment shown in FIGS. 4-7, battery compartment 30 is configured to hold up to three different battery types and sizes. In alternative embodiments, the battery compartment may hold only two different battery types and sizes, or may hold four or more different battery types and sizes. Additionally, battery compartment 30 is configured so that when one battery is inserted into battery compartment 30, additional batteries can not be inserted at the same time into battery compartment 30. This prevents a user from putting more than one battery into battery compartment 30 at the same time. In an alternative embodiment, the battery compartment may be shaped and sized to receive multiple batteries of multiple sizes or types, in either a series or parallel arrangement. The battery compartment may be shaped and sized (e.g. lengthened, widened) to receive, for example, but not limited to, two AA batteries, two AAA batteries, or two CR123A batteries. In another alternative embodiment, the battery compartment may be shaped and sized to receive two C batteries, two D batteries, or two CR2 batteries. Battery compartment 30 may be made of plastic, metal, or other materials.

Referring to FIGS. 4-7, rear contact assembly 32 includes a rear contact 50, a first rear contact surface 52, a second rear contact surface 54, and a third rear contact surface 56. In the exemplary embodiment shown in FIGS. 4 and 4a, rear contact 50 is shown common to rear contact surfaces 52, 54, and 56 and is configured to make contact with the negative terminals of batteries of multiple sizes or types. Rear contact assembly 32 may be formed from a stamping, or, in an alternative embodiment, the rear contact may include three small diameter pins under spring pressure that protrude through each rear contact surface 52, 54, 56 of rear contact assembly 32 and are electrically connected to one another. Rear contact assembly 32 may be made of metal, plastic or other materials.

Still referring to FIGS. 4-7, battery compartment 30 and rear contact assembly 32 are configured to positively retain (e.g. hold, surround, contain, etc.) batteries of multiple types and sizes. Battery compartment 30 and rear contact assembly 32 are sized, for example, in diameter and depth, to positively retain batteries of multiple types and sizes. In an alternative embodiment, the battery compartment alone (i.e. without the rear contact assembly) may be sized to positively retain batteries of multiple types and sizes. In a further alternative embodiment, the rear contact assembly alone (i.e. without the battery compartment) may be sized to positively retain batteries of multiple types and sizes.

In the exemplary embodiment shown in FIGS. 4-7, battery compartment 30 holds up to three different battery types and sizes. In the exemplary embodiment shown in FIGS. 4-7, the three different battery types and sizes are AA, AAA, and CR123A batteries. In an alternative embodiment, the three different battery types and sizes are C, D, and CR2 batteries.

Referring to FIGS. 3-7, battery compartment 30 and rear contact assembly 32 operate together (i.e. in conjunction) to positively retain the chosen battery. Rear contact assembly 32 comprises a first rear contact surface 52, a second rear contact surface 54, and a third rear contact surface 56. An inner wall of each sub-compartment 70, 72, 74 positively retains the chosen battery in a first direction (e.g. by surrounding at least 180° of the outer wall of the chosen battery). The rear contact surfaces positively retain the chosen battery in a second direction that is different than the first direction, by locating the chosen battery at a specific height or depth.

As shown in FIGS. 4, 4a, and 5, first sub-compartment 70 is configured to positively retain a first battery 60 of a first type and size. First rear contact surface 52 locates first battery 60 at a first height or first position. In the exemplary embodiment shown in FIG. 5, first battery 60 is a AA battery. In an alternative embodiment, the first battery may be of other types and sizes, for example, a AAA, CR123A, C, D or CR2 size battery.

As shown in FIG. 6, second sub-compartment 72 may be configured to positively retain a second battery 62 of a second type and size. Second rear contact surface 54 may position second battery 62 at a second height or second position. In the exemplary embodiment shown in FIG. 6, second battery 62 is a AAA battery. In alternative embodiments, the second battery may be of other types and sizes.

As shown in FIG. 7, third sub-compartment 74 is configured to positively retain a third battery 64 of a third type and size. Third rear contact surface 56 may position third battery 64 at a third height or third position. In the exemplary embodiment shown in FIG. 7, third battery 64 is a CR123A battery. In an alternative embodiment, the third battery may be of other types and sizes.

In the embodiment shown in FIGS. 1-7, front contact 28 is sized appropriately and placed under spring pressure from spring 26 to contact the positive terminal of the battery being utilized, regardless of the sub-compartment containing the battery. Rear contact 50 is in contact with the negative terminal of the battery being utilized, regardless of the sub-compartment containing the battery. When switch 34 is activated (e.g. depressed, engaged, etc.), a circuit is completed between light source 24, circuit board 22 and the battery being utilized, either first battery 60, second battery 62, or third battery 64. Activating switch 34 channels power to the conductive outside body of the flashlight 10. If the outside body of the flashlight 10 is not conductive (e.g. plastic), switch 34 would connect to a wire or contact that would channel power to the circuit board 22. Once the flashlight circuit is complete (e.g. flashlight is turned on and current is being provided from the battery being utilized to the light source 24), circuit board 22 automatically converts the input voltage of the battery being utilized to the operating voltage requirements of the light source 24.

In an exemplary embodiment, circuit board 22 accomplishes the voltage conversion by utilizing a DC to DC converter circuit which converts a lower voltage source of direct current (like a battery) to the higher voltage direct current required by the light source 24. The conversion is performed by applying a DC voltage across an inductor or transformer for a short period of time (usually in the 100 kHz to 5 MHz range) that causes current to flow through the inductor or transformer and energy is stored magnetically. The source voltage (i.e. battery) is then switched off causing the magnetically stored energy from the inductor or transformer to be output at the higher voltage required by the light source 24. This DC to DC converter also contains an integrated circuit which regulates different input battery voltages and capacities to create a constant voltage to the light source 24.

In operation of the embodiment shown in FIGS. 1-7, a user will uncouple head assembly 14 from body 12. The user will then choose one of three different battery types and sizes and insert the one chosen battery into the corresponding battery sub-compartment 70, 72, or 74 of battery compartment 30. Batteries of different types and sizes may have different voltages. Once the one chosen battery is inside battery compartment 30, the user will couple head assembly 14 to body 12. The user will then activate switch 34 to turn flashlight 10 on or off. Circuit board 22 automatically adjusts or converts whichever input voltage it receives from the chosen battery to the specific operating voltage required by light source 24. For example, the user may load either a 1.5 volt battery (e.g. AA or AAA) or a 3 volt battery (e.g. CR123A) and the DC to DC converter of circuit board 22 will automatically adjust or convert the input voltage from the battery to the operating voltage required by light source 24. There are no dials, selectors, or switches or manipulation required by the user to adapt flashlight 10 to the selected battery type.

In other exemplary embodiments, flashlight 10 may be another type of portable lighting device such as a headlamp or lantern.

The construction and arrangement of the portable lighting device shown and described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes, and proportions of the orientations, etc.) without materially departing from the novel teachings and advantages of the subject matter recited in the description. For example, elements shown as integrally formed may be constructed of multiple parts or elements, the position of elements may be reversed or otherwise varied, and the nature or number of discrete elements or positions may be altered or varied. Other substitutions, modifications, changes, and omissions may be made in the design, operating conditions and arrangement of the exemplary embodiments without departing from the scope of the invention as expressed in the appended claims.

What is claimed is:

1. A portable lighting device, comprising:
    a generally cylindrical body having a battery compartment, the battery compartment comprising a first sub-compartment sized to receive a first battery of a first size and a second sub-compartment sized to receive a second battery of a second size, wherein the second size is different than the first size and wherein when either the first battery or the second battery is provided within the battery compartment, the other of either the first battery or the second battery is prevented from also being provided within the battery compartment;
    a contact assembly provided at an end of the body and comprising a first contact surface and a second contact surface different than the first contact surface, the contact assembly further comprising an electrical contact common to the first contact surface and the second contact surface;
    a light source coupled to the body; and
    a circuit coupled to the light source and adapted to provide a current from either the first battery or the second battery to the light source.

2. The portable lighting device of claim 1, wherein the battery compartment further comprises a third sub-compartment sized to receive a third battery of a third size, wherein the third size is different than the first size and the second size.

3. The portable lighting device of claim 2, wherein the first sub-compartment, second sub-compartment, and third sub-compartment are arranged to minimize the size of the portable lighting device.

4. The portable lighting device of claim 1, wherein the first sub-compartment and second sub-compartment are arranged to minimize the size of the portable lighting device.

5. The portable lighting device of claim 1, wherein the light source requires an operating voltage and further comprising a circuit board coupled to the body, wherein the circuit board converts input voltages of different magnitudes to the operating voltage.

6. The portable lighting device of claim 5, wherein the first battery has an input voltage different than the operating voltage, wherein the circuit board converts the input voltage to the operating voltage.

7. A portable lighting device, comprising:
    a generally cylindrical body;
    a head coupled to the body;
    a single circuit board coupled to the head and comprising a circuit; and
    a light source coupled to the circuit, the light source requiring an operating voltage;
    wherein the circuit is configured to convert input voltages of different physical sized batteries to the operating voltage, the different physical sized batteries having input voltages of different magnitudes.

8. The portable lighting device of claim 7, further comprising a battery having an input voltage different than the operating voltage, wherein the circuit board converts the input voltage to the operating voltage.

9. The portable lighting device of claim 7, further comprising a battery compartment within the body, the battery compartment comprising a first sub-compartment sized to receive a first battery of a first size and a second sub-compartment sized to receive a second battery of a second size, wherein the second size is different than the first size.

10. The portable lighting device of claim 9, wherein the battery compartment further comprises a third sub-compartment sized to receive a third battery of a third size, wherein the third size is different than the first size and the second size.

11. The portable lighting device of claim 10, wherein the first sub-compartment, the second sub-compartment, and the third sub-compartment are arranged to minimize the size of the portable lighting device.

12. The portable lighting device of claim 10, further comprising a front contact coupled to the circuit board, the front contact configured to contact any one of a first terminal of the first battery, a second terminal of the second battery, or a third terminal of the third battery.

13. The portable lighting device of claim 7, further comprising a rear contact coupled to the body, the rear contact configured to contact batteries of multiple sizes.

14. A portable lighting device, comprising:
a body having a battery compartment, the battery compartment configured to selectively receive batteries of different sizes, wherein when a battery of a first size is provided within the body, the battery compartment is configured to prevent placement of batteries of other capable sizes within the body;
a head coupled to the body;
a light source coupled to the head, the light source requiring an operating voltage; and
a single circuit coupled to the light source and configured to convert input voltages of batteries of different physical sizes to the operating voltage; the input voltages of the batteries of different physical sizes having different magnitudes.

15. The portable lighting device of claim 14, wherein the battery compartment further comprises a first sub-compartment sized to receive a first battery of a first size and a second sub-compartment sized to receive a second battery of a second size, wherein the second size is different than the first size.

16. The portable lighting device of claim 15, wherein the battery compartment further comprises a third sub-compartment sized to receive a third battery of a third size, wherein the third size is different than the first size and the second size.

17. The portable lighting device of claim 16, wherein the battery compartment is sized to receive any one of a AA battery, a AAA battery, and a CR123A battery.

18. The portable lighting device of claim 16, wherein the battery compartment is sized to receive any one of a C battery, a D battery, and a CR2 battery.

19. The portable lighting device of claim 14, further comprising a front contact coupled to the circuit board, the front contact configured to contact batteries of multiple sizes.

20. The portable lighting device of claim 14, further comprising a rear contact coupled to the body, the rear contact configured to contact batteries of multiple sizes.

* * * * *